United States Patent

Lygum

[11] Patent Number: 5,476,034
[45] Date of Patent: Dec. 19, 1995

[54] OVEN WITH SMOKE GAS BYPASS

[75] Inventor: Poul Lygum, Bakel, Netherlands

[73] Assignee: Koppens Machinefabriek B.V., Bakel, Netherlands

[21] Appl. No.: 211,483

[22] PCT Filed: Oct. 15, 1992

[86] PCT No.: PCT/NL92/00184

§ 371 Date: Apr. 6, 1994

§ 102(e) Date: Apr. 6, 1994

[87] PCT Pub. No.: WO93/07794

PCT Pub. Date: Apr. 29, 1993

[30] Foreign Application Priority Data

Oct. 16, 1991 [NL] Netherlands ............... 9101727
Mar. 26, 1992 [NL] Netherlands ............... 9200558

[51] Int. Cl.⁶ .................................. A47J 37/12
[52] U.S. Cl. ................. 99/403; 99/404; 126/391
[58] Field of Search ............... 99/403–407, 330, 99/331, 336, 337; 126/391, 387; 110/204, 211, 212

[56] References Cited

U.S. PATENT DOCUMENTS

| | | | |
|---|---|---|---|
| 1,347,586 | 7/1920 | Mitchell. | |
| 2,478,732 | 8/1949 | Wilson et al. | 126/391 X |
| 3,376,806 | 4/1968 | Magnusson | 99/404 X |
| 3,970,072 | 7/1976 | Chipchase | 126/391 |
| 4,228,730 | 10/1980 | Schindler et al. | 99/329 R |
| 4,289,111 | 9/1981 | Duncan et al. | 126/391 |
| 4,751,915 | 6/1988 | Price | 126/391 |
| 4,848,317 | 7/1989 | Prudhomme et al. | 126/391 |
| 4,858,592 | 8/1989 | Hayek et al. | 126/373 |
| 4,898,151 | 2/1990 | Luebke et al. | 126/391 |
| 4,913,042 | 3/1990 | Miller | 99/404 |
| 5,209,218 | 5/1993 | Daneshvar et al. | 126/391 |
| 5,215,075 | 1/1993 | Caridis et al. | 99/403 X |
| 5,253,567 | 10/1993 | Gunawardena | 99/404 |

FOREIGN PATENT DOCUMENTS

| | | |
|---|---|---|
| 0064407 | 11/1982 | European Pat. Off.. |
| 0347797 | 12/1989 | European Pat. Off.. |
| 3533272 | 3/1987 | Germany. |
| 575783 | 3/1946 | United Kingdom. |
| 760393 | 10/1956 | United Kingdom. |
| 803210 | 10/1958 | United Kingdom. |

Primary Examiner—David Scherbel
Assistant Examiner—Patrick F. Brinson
Attorney, Agent, or Firm—Young & Thompson

[57] ABSTRACT

An oven for frying food products in hot oil comprises a tank (1) in which the frying oil can be accommodated, a gas-fired heating device (9) connected to a heat exchanger (19) which is situated in the tank and through which the smoke gases flow, and also an outlet (30) for the smoke gases emerging from the heat exchanger. In order to avoid overheating of the oil near the heating device, a bypass pipe (34) connected to the outlet is provided for conveying at least a part of the outlet smoke gases back through the heat exchanger.

19 Claims, 3 Drawing Sheets

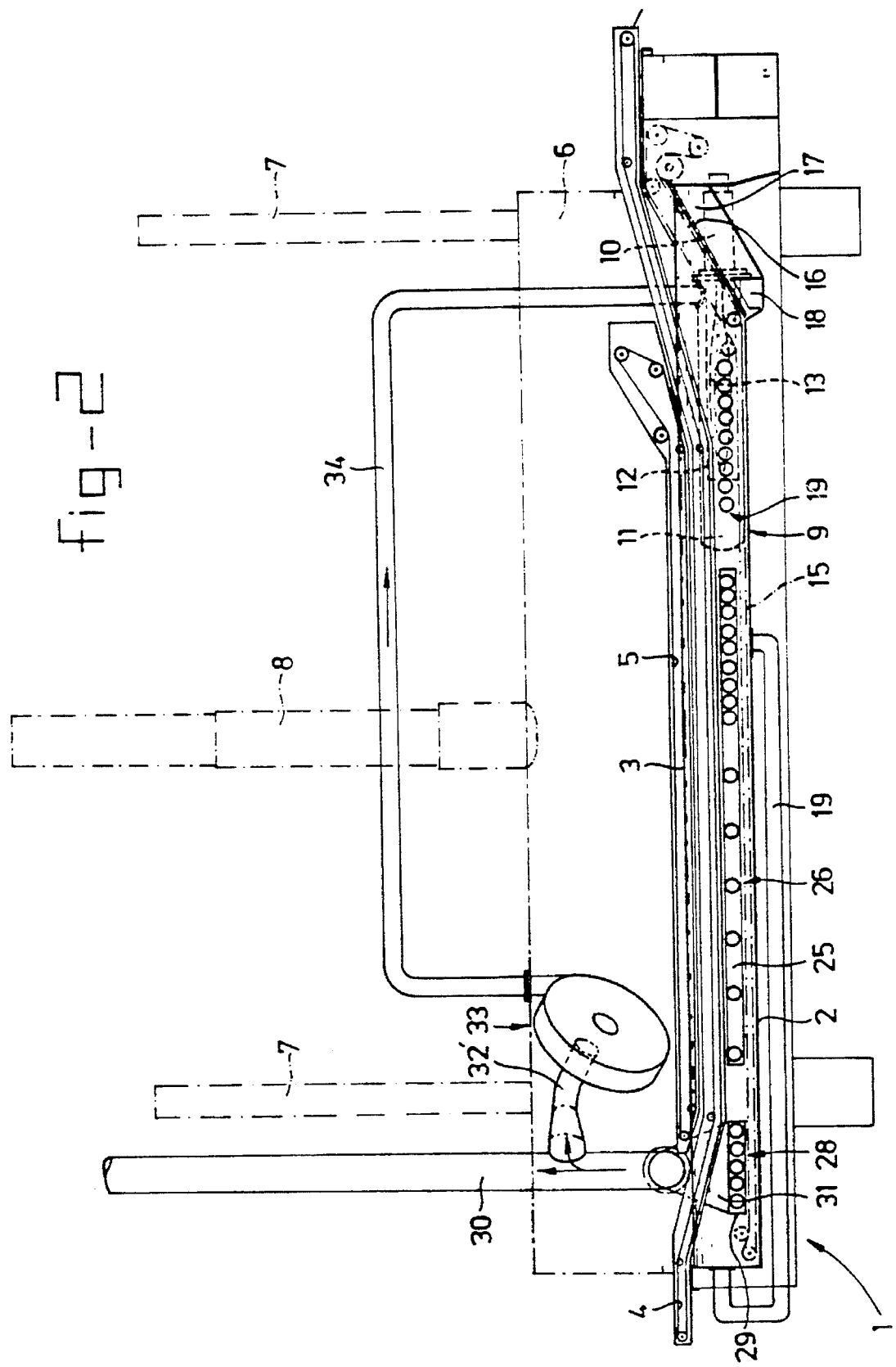

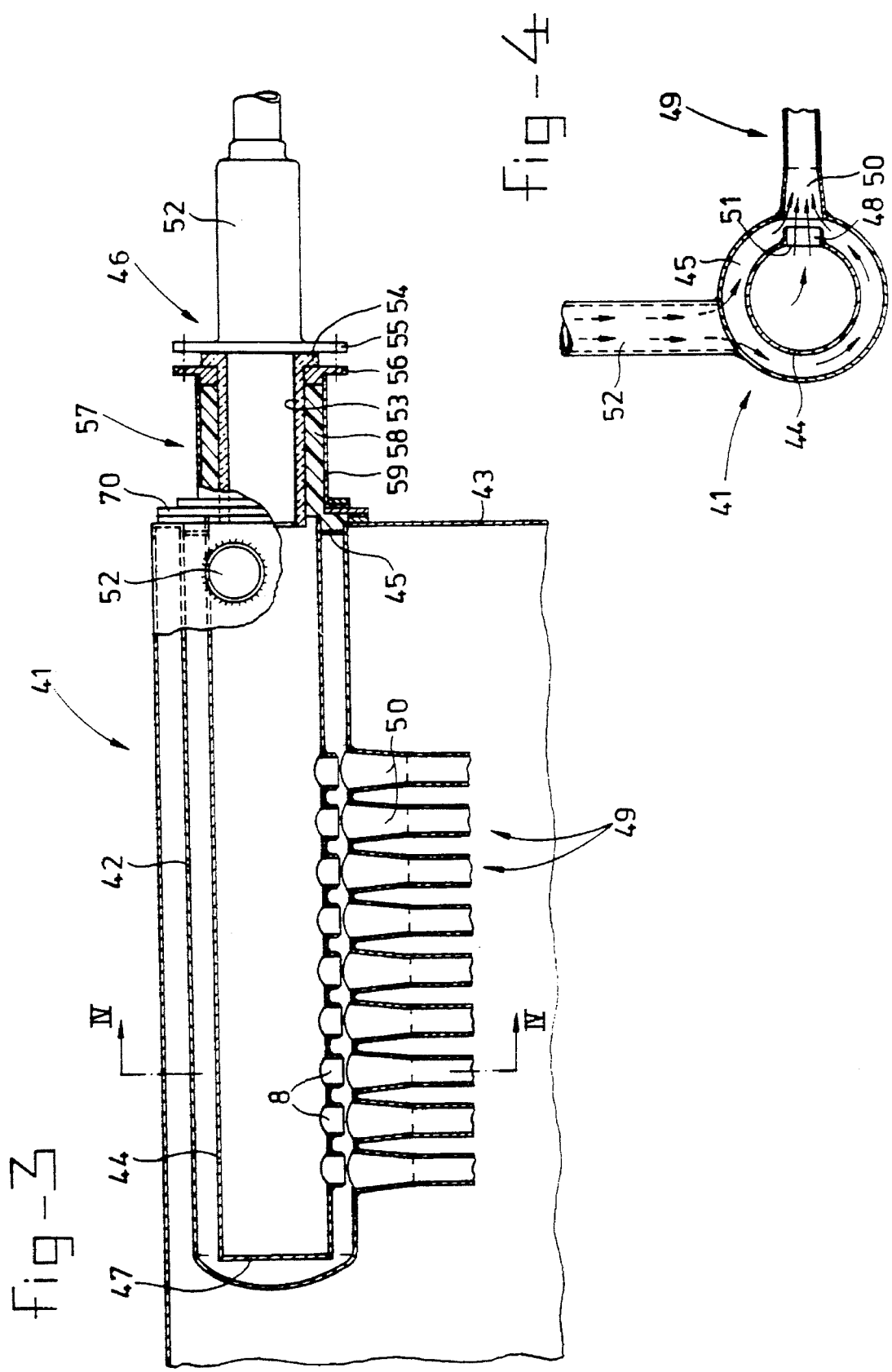

OVEN WITH SMOKE GAS BYPASS

BACKGROUND OF THE INVENTION

The invention relates to an oven for frying food products in hot oil, comprising a tank in which the frying oil can be accommodated, a gas-fired heating device connected to a heat exchanger which is situated in the tank and through which the smoke gases flow, and also an outlet for the smoke gases emerging from the heat exchanger. Such ovens are used for factory production of food products such as schnitzels, pre-fried chips, etc. They generally have a conveyor belt through which the frying oil can pass and by means of which the food products are conveyed continuously through the hot frying oil.

A heat exchanger, comprising a number of heat exchange pipes, is provided in the tank in order to heat the frying oil. These pipes preferably extend over as large a part of the tank as possible, in order to heat the oil uniformly in this way. Nevertheless, the part of each heating pipe closest to the heating device has a relatively high temperature. Particularly if the inner wall of this part of the heating pipes is directly exposed to the gas flame supplied by the heating device, there is a risk of the oil film on the pipes becoming too hot. The oil is cracked as a result, so that harmful products are formed. It will be clear that the formation of such harmful products is unacceptable.

The remaining greater part of the heat exchange pipes obtains its heat from the smoke gases flowing through it. However, the temperature of the smoke gases has already fallen greatly, particularly near the end of the pipes, which adversely affects uniform heating of the oil in the tank.

SUMMARY OF THE INVENTION

The object of the invention is therefore to provide an oven of the type described above in which a more uniform heating of the oil in the tank is ensured, in such a way that excessively high local temperatures in the oil are avoided. This object is achieved through a bypass pipe connected to the outlet being provided for conveying at least a part of the outlet smoke gases back through the heat exchanger. According to the invention, the already cooled smoke gases obtained at the outlet are mixed with the smoke gases supplied directly by the heating device, which are still at a relatively high temperature. The mixture formed has a lower temperature, as a result of which overheating of the oil can be prevented.

Mixing in a part of the smoke gases also results in the flow velocity in the heat exchange pipes increasing. A higher flow velocity increases the turbulence in the flow, which has a beneficial effect on the heat transfer. This means that an acceptable temperature level can also be maintained in the oil in the part of the heat exchange pipes lying further downstream.

The admixture of smoke gases thus ensures a more uniform temperature distribution in the oil.

A further advantage of the invention is that a part of the heat present in the smoke gases is recovered. The heating device goes into operation only when the temperature of the oil becomes too low. The new, hot smoke gases formed in the process represent an additional volume which is discharged through the outlet in the form of cooled smoke gases.

In the case of the known gas-fired heating device a gas burner with an open flame is generally used. The oxygen from the environment is used for maintaining the combustion. As already mentioned, this known design has the disadvantage that the first part of the heat exchange pipes becomes too hot. A further disadvantage is the fire risk associated with the open flame. In these respects a further improvement can be obtained in the case of the device according to the invention by providing in the tank, below its nominal oil level, a first chamber into which both the bypass pipe and a flame tube, which is connected in a sealing manner to a gas burner, are connected, which chamber is also connected to the heat exchanger. The gas flame is now not directly in contact with the walls of the chamber flushed by the oil, but with the flame tube. This further reduces the risk of overheating the oil. The gas flame is also completely shut off from the environment by this, which largely eliminates the fire risk.

The combustion gases have the highest temperature near the flame. The temperature of the chamber can also become exceedingly high in the region where the flame emerges from the flame tube. The result of this is that the oil can become overheated at that point. In order also to avoid this local overheating, the chamber is connected to a number of heat exchange pipes, and the flame tube has a number of outflow apertures for the combustion gases, each of which is aligned relative to a corresponding heat exchange pipe. The hot gases emerging from the outflow apertures of the flame tube now do not come into direct contact with the outer wall of the chamber. They are screened off to a certain extent while flowing into the heat exchange pipes by the cooler gas around the flame tube, and mixing of hot and cooler gas already occurs here.

In order to ensure the desired guidance of the combustion gases and the heat exchange Eases and the heat exchange pipes, the outflow apertures are formed by pipe sections which each project relative to the flame tube in the direction of a corresponding heat exchange pipe.

Conveying the cooler gas along with the hot combustion gases outside the flame tube can be influenced beneficially if each of the heat exchange pipes have a connecting piece which is connected to the chamber and has a decreasing cross-section from the flame tube onwards.

The velocity at which the hot gases flow into the heat exchange pipes depends, inter alia, on their diameter. If the latter is selected greater near the inlet, the velocity of the hot gases remains relatively low at that point, which prevents overheating.

In connection with the supply of cooler gas into the chamber, a supply line opens out into it, for supplying air or circulated combustion gases at excess pressure. Under the influence of this excess pressure, the cooler gas is forced into the heat exchange pipes, in such a way that the desired screening off of the hot gas occurs.

A ceramic sleeve is preferably placed between the burner and the flame tube, which sleeve lies outside the oil space of the oven and has an external insulation. The ceramic material also has very good resistance to the high temperatures in the flame. The insulation means that only a little heat is lost.

The heat exchanger preferably has a first set of parallel heat exchange pipes, running through the tank and connected at one end to the first chamber and at the other end to a second chamber. A compact construction can be obtained if the tank in which the frying oil can be accommodated is elongated, the first and second chambers run in the lengthwise direction of the tank, and the heat exchange pipes run essentially in the crosswise direction of the tank.

The first chamber of the heat exchanger can be accommodated in a separate compartment of the tank, which compartment is connected, on the one hand, to a filter unit provided on an end face of the tank and, on the other, to a pressure pipe provided with a pump for pumping the filtered oil along the first chamber and through the pressure pipe to the opposite end face of the tank.

The first set of heat exchange pipes here is guided from the first chamber to the second chamber by means of bores in the partition between the compartment and the rest of the tank.

The oil which has flowed along the first chamber is at a relatively high temperature. This oil is fed to the opposite end face of the tank, where the smoke gases in the heat exchanger are already partially cooled. A uniform temperature distribution of the oil is also ensured by this.

The heat exchanger can be provided with at least a second set of heat exchange pipes which is connected, on the one hand, to the second chamber and, on the other, to a third chamber running in the lengthwise direction of the tank and situated at the opposite side thereof. The smoke gases thus follow a path running to and fro between the longitudinal walls of the tank, in such a way that an intensive heat exchange is possible.

As already mentioned, the heat exchange is beneficially influenced by a high flow velocity in the heat exchange pipes. Since the cooled smoke gases have a smaller volume than the smoke gases coming directly from the gas flame, the flow velocity going in the downstream direction is lower. This is all the more of a disadvantage since the heat transfer already lies at a lower level as a result of the lower temperature of the smoke gases.

The invention also provides an improvement in this respect if the heat exchanger is designed in such a way that the total flow surface of the next set of heat exchange pipes in the direction of flow is smaller than that of a preceding set of heat exchange pipes in the direction of flow. The flow velocity of the smoke gases going in the downstream direction can now be maintained at a reasonable level, which means that a good heat transfer can still be achieved.

According to a first possibility, provision is made for each subsequent set of heat exchange pipes to have a smaller number of pipes than a preceding set.

According to a second possibility, provision can, however, be made for each set of heat exchange pipes to have the same number of pipes, and each subsequent set to have one or more pipes with a smaller internal diameter than a preceding set.

In order to limit any tension differences as a result of temperature fluctuations, each heat exchange pipe has parallel end pieces which are staggered relative to each other and are connected by an essentially S-shaped connecting piece.

In order to ensure a suitable circulation velocity of the smoke gases, a booster can be fitted in the bypass pipe.

BRIEF DESCRIPTION OF THE DRAWINGS

The invention will be explained in greater detail below with reference to an example of an embodiment.

FIG. 2 shows a side view, in cross-section, of the oven according to FIG. 1.

FIG. 3 shows a top view, partially in cross-section, of the heating device.

FIG. 4 shows a cross-section along the line II—II of FIG. 1.

DETAILED DESCRIPTION OF THE INVENTION

Figure 1:
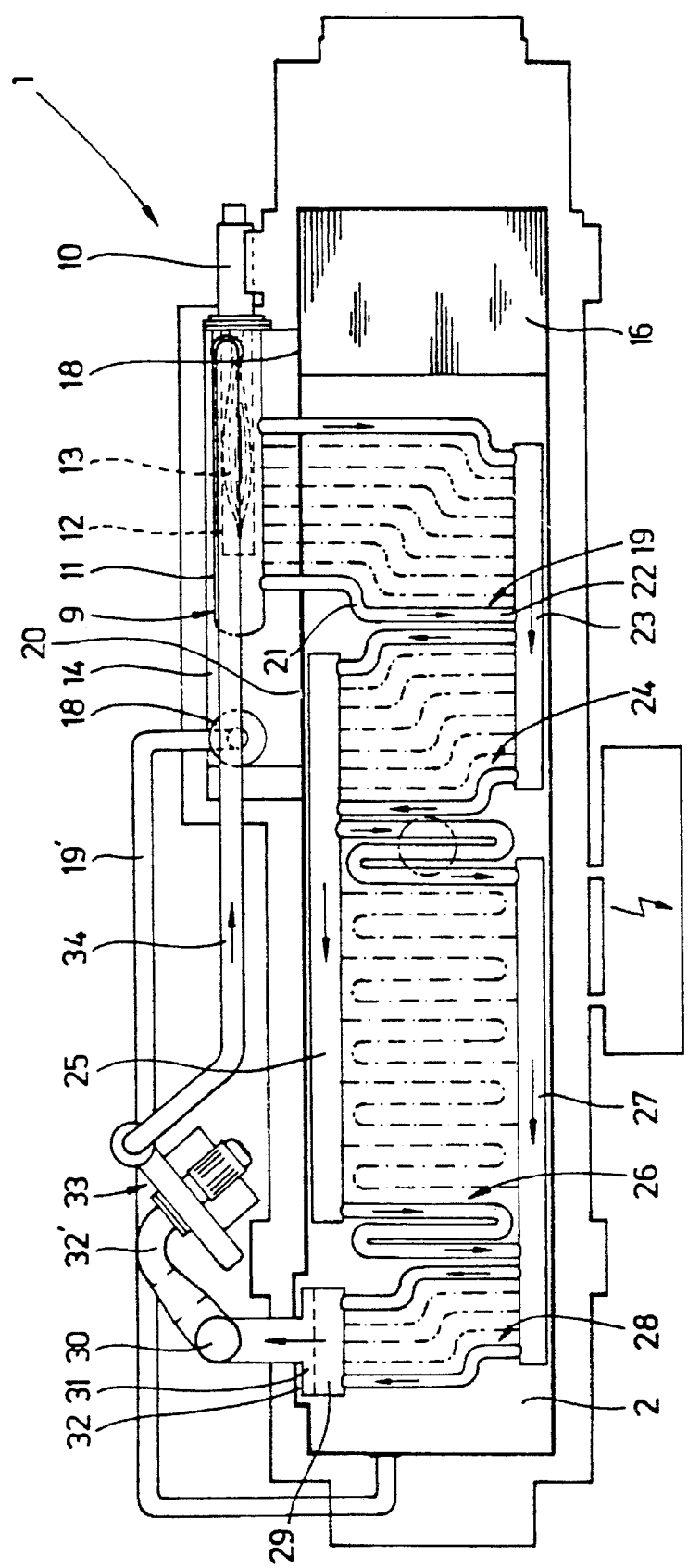
FIG. 1 shows a top view of an oven according to the invention.

The oven shown in FIG. 1 has a tank of a design which is known per se, and is indicated in its entirety by 1. The tank is made of stainless steel, and is insulated with mineral wool. The oil can be placed in the interior space 2 of the tank. It can be seen in FIG. 2 that the tank 1 is filled with oil up to the level 3. A lower conveyor belt 4 and an upper conveyor belt 5, known per se, are also provided in this figure. The products to be fried are placed on conveyor belt 4, are immersed in the oil through the slanting part thereof, and are conveyed out of the oil again by means of the an opposite slanting part. The conveyor belt 5 is intended for preventing the products immersed in the oil from floating.

It is also shown by dashed lines that the oven 1 can have a cap 6 which is known per se. Also shown schematically are the lifting devices 7, 8, which are also known per se, and by which both the cap and the conveyor belts 4 and 5 can be lifted out of the tank in order to clean it.

The heating device 9 is shown by dashed lines in FIG. 2. This heating device is connected in a sealing manner to a gas burner 10 at its end projecting from the tank. As can be seen better in FIG. 1, the heating device 9 also has a chamber 11 which is flushed by the oil. The chamber 1 contains a flame tube 12, indicated by dashed lines, which is connected to the gas burner 10. The gas flame 13 forming in the flame tube 12 is also shown. As can be seen, this gas flame 13 does come into direct contact with the inside walls of the flame tube 12, but not with the wall of the chamber 11.

The heating device 9 is fitted in a part 14 of the tank 1 which projects outwards a little. This means that the heating device can be placed outside the path of the conveyor belts 4, 5 and of the scraper unit 15 shown schematically in FIG. 2. This scraper unit 15 is known per se, and the lower part thereof moves to the right in FIG. 2, in the course of which any waste which has collected on the bottom of the tank 1 is conveyed to filter 16. The waste is then removed from the tank through filter 16 by a separating device which is known per se, and which is not shown.

The oil passing through the filter 16 passes into the part 17 of the tank 1, and can pass through recess 18 into the slightly projecting part 14 of the tank 1, in which the heating device 9 is situated. The filtered oil is heated here by the chamber 11, and in the end is returned to the oil tank by means of pump 18' through pipe 19' to the opposite end face of the tank 1.

As can be seen clearly in the top view of FIG. 1, a first set of heat exchange pipes 19 is connected to the chamber 11. These pipes run through the partition 20, which separates the part 14 from the interior space 2 of the tank 1. For this purpose, openings of suitable dimensions are provided in the partition 20. Each heat exchange pipe 19 can comprise two pipe parts 22 connected by the S-shaped part 21. Expansion differences in the pipes can be compensated for by this shape. It is, however, pointed out that other pipe shapes, for example straight pipes, are possible if the expansion differences remain limited.

The first set of pipes is also connected to a second chamber 23. The smoke gases formed by the flame 13 can thus flow through the interior space of the chamber 11 and through the pipes 19 to the second chamber 23. The smoke gases are collected in this chamber 23, and they can then flow through the second set of pipes 24 to a third chamber 25. Chambers 23 and 25 are situated at opposite long sides of the tank 1. From the chamber 25 a third set of pipes 26 then extends to an opposite-lying fourth chamber 27. Finally, the smoke gases flow through a fourth set of pipes 28 to chamber 29, which is connected to the outlet 30. Between the outlet 30 and the chamber 29 is a flat discharge piece 31, which fits into a recess 32 in the inner wall of the tank 1. As a result, the belts 4, 5 can pass unimpeded here too.

As illustrated in the embodiment shown in FIG. 1, the number of pipes decreases in each following set. Set 19 still has 9 pipes, while the number of pipes of set 28 is reduced to 5. The result of this is that the total available cross-section for the smoke gas flow decreases. However, the smoke gases at set 28 have a lower temperature, and therefore a lower volume. As a result of the decrease in the cross-section of the pipes, a more or less constant smoke gas velocity can nevertheless be ensured over the entire flow path of the smoke gases in the heat exchanger, in such a way that the desired turbulence—and consequently heat transfer—is always ensured.

The outlet 30 is also connected by means of the branch line 32' to a booster 33. This booster 33 extracts a part of the smoke gases from the outlet 30, and forces them through the bypass pipe 34 to the chamber 11. The diverted smoke gases are mixed there with the newly formed, hot smoke gases. It can be ensured in this way that the temperature of the smoke gases in chamber 11 does not become too high, so that the cracking of oil near chamber 11 can be avoided. The velocity of the smoke gases in the heat exchanger can also be maintained at a high level by means of the booster 33, with the result that, as discussed above, a good heat exchange can be obtained.

Temperature sensors and a regulating device, by means of which the gas burner 10 can be controlled, are also fitted in the device according to the invention. If the oil is at the desired temperature level, the gas burner 10 does not go into operation. As soon as the temperature falls below a threshold value, the gas burner 10 is ignited automatically. New smoke gases are formed in the process, which results in a part of the cooled smoke gases being discharged through the outlet 30, in order to compensate for the volume of the newly formed hot smoke gases.

FIG. 3 shows a part of the tank 41 containing the oil in which the food products are fried. In this tank 41 extends the chamber 42, from the end wall 43 of tank 41. The flame tube 44 is accommodated in the chamber 42. It is fixed by means of flange 45 to chamber 42.

Flame tube 44 is connected at its one side to the combustion device indicated in its entirety by 46, and at its other side is shut off by partition 47. The hot combustion gases supplied by the combustion device 46 can flow out of the flame tube 44 to the outside through a number of pipe sections 48, projecting laterally relative to the flame tube 44.

These pipe sections 48 are each placed directly opposite a heat exchange pipe indicated in its entirety by 49. As can be seen in the cross-section of FIG. 4, the connecting piece 50, by means of which each heat exchange pipe 49 is connected to the chamber 41, is tapered. The pipes can, however, also be fully cylindrical. The flow 51 of hot combustion gases emerging from the flame tube 44 now enters the heat pipes 49, and in the process is screened off by the cooler gases flowing along with them in the space bounded by the flame tube 44, on the one hand, and the chamber 41, on the other.

The cooler gas can be fed in through pipe 52 to chamber 41. By means of this pipe 52, it is possible as desired to feed in by means of a booster outside air or cooled smoke gases, which are discharged to the end of the heat exchanger formed by the heat exchange pipes 49.

The emerging flow 51 of combustion gases, at a very high temperature, now does not come into direct contact with the wall of chamber 42 or the wall of the heat exchange pipes 49. As can be seen in FIG. 4, the hot combustion gases are enveloped in a cooler casing, comprising the gases coming from the chamber 42. In this way it can be ensured that at no single point do the walls of the heating device become so hot that the oil would ignite.

The heating device 46 comprises a burner 52 which is known per se, and in which gas or oil can be burned. This burner 52 is connected by means of a ceramic sleeve 53 to the flame tube 44. For this purpose the ceramic sleeve has a flange 54 which is clamped between a fixing flange 55 on the burner 52 and a fixing flange 56. This fixing flange 56 forms part of an insulating casing indicated in its entirety by 57. This insulating casing 57 comprises a layer of insulating material 58, surrounded on the outside by a steel tube 59. This tube 59 is fixed to flange 56. At the other side this tube 59 is fixed by means of flange 20 to the wall of the tank 1. The burner is supported relative to the tank 41 by means of the flanges 56, 70 and the tube 59.

The flame occurring behind the burner is now in contact with the ceramic sleeve 53. The latter has good resistance to it, while in that region no further heat losses occur as a result of the insulating casing 57. The length of sleeve 53 (and casing 57) can be selected in such a way that the flame extends over the desired distance in the flame tube 44.

I claim:

1. Oven for frying food products in hot oil, comprising a tank for accommodating frying oil, a gas-fired heating device connected to a heat exchanger which is situated in the tank and through which smoke gases flow, an outlet for the smoke gases emerging from the heat exchanger, a bypass pipe having a first end connected to the outlet for conveying at least a part of the outlet smoke gases back through the heat exchanger, said tank including a first chamber fluidly connected to the heat exchanger, a flame tube sealingly connected to a gas burner within said first chamber, and said bypass pipe having a second end connected to said first chamber.

2. Oven according to claim 1, wherein the first chamber is connected to a number of heat exchange pipes, and the flame tube has a number of outflow apertures for combustion gases, each of said outflow apertures being aligned relative to a corresponding heat exchange pipe.

3. Oven according to claim 2, wherein the outflow apertures are formed by pipe sections, each of said pipe sections projecting relative to the flame tube in the direction of a corresponding heat exchange pipe.

4. Oven according to claim 3, wherein each of the heat exchange pipes has a connecting piece which is connected to the first chamber and has a cross-section which decreases from the flame tube onwards.

5. Oven according to claim 3, further comprising a supply pipe opening out into the first chamber for supplying one of air and circulated combustion gases at excess pressure.

6. Oven according to claim 3, wherein the first chamber and flame tube are cylindrical.

7. Oven according to claim 6, wherein the first chamber and flame tube are concentric.

8. Oven according to claim 1, further comprising a ceramic sleeve positioned between the burner and the flame tube, said sleeve having an external insulation.

9. Oven according to claim 3, wherein a first set of parallel heat exchange pipes runs through the tank and is connected at one end to the first chamber and at the other end to a second chamber.

10. Oven according to claim 9, wherein the tank is elongated, the first and second chambers run in the lengthwise direction of the tank, and the heat exchange pipes run essentially in the crosswise direction of the tank.

11. Oven according to claim 10, wherein the first chamber is accommodated in a separate compartment of the tank, said compartment being connected both to a filter unit provided on an end face of the tank and to a pressure pipe provided with a pump for pumping filtered oil along the first chamber and through the pressure pipe to the opposite end face of the tank.

12. Oven according to claim 11, wherein the first set of heat exchange pipes is guided from the first chamber to the second chamber by means of bores in a partition between the compartment and the rest of the tank.

13. Oven according to claim 10, further comprising at least a second set of heat exchange pipes connected both to the second chamber and to a third chamber running in the lengthwise direction of the tank and situated at the opposite side thereof.

14. Oven according to claim 13, wherein more than two sets of heat exchange pipes are provided, each connected to two chambers situated at opposite sides of the tank, and the last chamber in the flow direction of the smoke gases is connected to the outlet.

15. Oven according to claim 14, wherein the total flow surface of a downstream set of heat exchange pipes in the direction of flow has a smaller total flow surface than that of a preceding set of heat exchange pipes in the direction of flow.

16. Oven according to claim 15, wherein each following set of heat exchange pipes has a smaller number of pipes than a preceding set.

17. Oven according to claim 15, wherein each of heat exchange pipes has the same number of pipes, and each following set has at least one pipe with a smaller internal diameter than a preceding set.

18. Oven according to claim 9, wherein each heat exchange pipe has parallel end pieces which are staggered relative to each other and are connected by an essentially S-shaped connecting piece.

19. Oven according to claim 1, wherein said first end of the bypass pipe is connected to the outlet via a booster.

* * * * *